United States Patent
Mock et al.

(10) Patent No.: US 9,259,964 B2
(45) Date of Patent: Feb. 16, 2016

(54) WHEEL BEARING HAVING A SENSOR HOLDER

(71) Applicants: Christian Mock, Schweinfurt (DE); Florian Koeniger, Schweinfurt (DE); Kay Schumacher, Stadtlauringen (DE)

(72) Inventors: Christian Mock, Schweinfurt (DE); Florian Koeniger, Schweinfurt (DE); Kay Schumacher, Stadtlauringen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/378,884

(22) PCT Filed: Feb. 12, 2013

(86) PCT No.: PCT/EP2013/052761
§ 371 (c)(1),
(2) Date: Aug. 14, 2014

(87) PCT Pub. No.: WO2013/135448
PCT Pub. Date: Sep. 19, 2013

(65) Prior Publication Data
US 2015/0055903 A1    Feb. 26, 2015

(30) Foreign Application Priority Data
Mar. 15, 2012 (DE) .......................... 10 2012 204 039

(51) Int. Cl.
*F16C 33/76* (2006.01)
*F16C 41/00* (2006.01)
*B60B 27/00* (2006.01)
(Continued)

(52) U.S. Cl.
CPC ........... *B60B 27/0068* (2013.01); *F16C 33/723* (2013.01); *F16C 41/007* (2013.01); *B60B 27/00* (2013.01); *B60B 27/0005* (2013.01); *B60B 2900/113* (2013.01); *B60B 2900/321* (2013.01); *F16C 19/186* (2013.01); *F16C 2326/02* (2013.01)

(58) Field of Classification Search
CPC ........................... F16C 41/007; F16C 2326/02
USPC .................................................. 384/448, 489
See application file for complete search history.

(56) References Cited

U.S. PATENT DOCUMENTS 5,756,894 A    5/1998 Paolo et al.
5,814,984 A *  9/1998 Ohmi et al. ................... 324/173
(Continued)

FOREIGN PATENT DOCUMENTS

DE    11 2010 003926    12/2012
EP    1 552 694         7/2005
(Continued)

*Primary Examiner* — Phillip A Johnson
(74) *Attorney, Agent, or Firm* — Davidson, Davidson & Kappel, LLC

(57) ABSTRACT

A wheel bearing having a sensor holder (8) to hold a sensor that detects the rotational movement of a wheel, including:
   a rotating inner race (1) onto which a wheel of the motor vehicle can be mounted,
   a stationary outer race (2) attached to a motor vehicle,
   an encoder (4) associated with the rotating inner race (1),
   a cover (4) arranged on the stationary outer race (2),
whereby the sensor holder (8) is formed by a recess that is provided in the cover (3) and that is arranged opposite from the encoder (4), said recess being closed on the side facing the encoder (4) by a partition (7) that is permeable to the magnetic alternating field between the encoder (4) and the sensor.

7 Claims, 5 Drawing Sheets

(51) Int. Cl.
*F16C 33/72* (2006.01)
*F16C 19/18* (2006.01)

(56) References Cited

U.S. PATENT DOCUMENTS

| | | |
|---|---|---|
| 2005/0254648 A1 | 11/2005 | Nahum et al. |
| 2006/0277985 A1 | 12/2006 | Faetannini |
| 2012/0013329 A1 | 1/2012 | Hattori et al. |
| 2012/0189234 A1 | 7/2012 | Torii |

FOREIGN PATENT DOCUMENTS

| | | |
|---|---|---|
| EP | 1552964 | 7/2005 |
| JP | 1073612 | 3/1998 |
| JP | 2004 354 066 | 12/2004 |
| JP | 2004 354299 | 12/2004 |
| JP | 2006105185 | 4/2006 |
| WO | WO 2004/030363 | 4/2004 |
| WO | WO 2008/006777 | 1/2008 |
| WO | WO 2011043306 A1 * | 4/2011 |

* cited by examiner

WHEEL BEARING HAVING A SENSOR HOLDER

The invention relates to a wheel bearing having a sensor holder to hold a sensor that detects the rotational movement of a wheel.

BACKGROUND

Such a wheel bearing is known, for example, from U.S. Pat. No. 5,756,894. The basic structure of the wheel bearing consists of a wheel hub that is attached to a motor vehicle and that has a stationary outer race and a rotating inner race onto which a wheel of the motor vehicle can be mounted. The structure described corresponds to the wheel bearing provided on a non-driven wheel. Between the outer race and the inner race, there is a bearing which comprises a plurality of rolling elements that are arranged, for example, in two parallel bearing races. Moreover, an encoder, for instance, in the form of a toothed ring, is non-rotatably secured on the rotating inner race. The stationary outer race also has a sensor holder to hold a sensor that is positioned in such a way that the surface of the sensor held therein is situated opposite from the rotating encoder. Fundamentally speaking, the wheel bearing has to be lubricated, whereby, in order to attain the longest possible service life, it is important for the lubricant not to leak out or to be contaminated by dirt particles that might get into it. For this purpose, the wheel bearing has to be sealed. Since the sensor holder of the wheel bearing disclosed in U.S. Pat. No. 5,756,894 is open towards the encoder, this wheel bearing has to have a gasket situated between the sensor and the sensor holder. This gasket itself increases the probability that damage might occur to the wheel bearing since the gasket can be damaged, for example, when the wheel bearing is being assembled or it might lose its sealing effect due to wear and tear.

International patent application WO 2008/006777 A1 discloses a wheel bearing in which the encoder is additionally protected towards the outside by means of a cover that prevents the penetration of dirt particles while also preventing leakage of the lubricant. In the case of this wheel bearing, the sensor itself has to be mounted on the outside since no sensor holder is provided on the wheel bearing itself.

SUMMARY OF THE INVENTION

It is the objective of the invention to put forward a wheel bearing that has a sensor holder and that should be easy to assemble and have a long service life.

The present invention provides the sensor holder to be formed by a recess that is provided in the cover and that is arranged opposite from the encoder, said recess being closed on the side facing the encoder by a partition that is permeable to the magnetic alternating field between the encoder and the sensor. Due to the proposed configuration of the sensor holder, including the partition present in the recess, the gasket that had been needed so far can now be dispensed with, thereby increasing the service life of the wheel bearing and reducing the probability of damage. Furthermore, the assembly work can be reduced since there is no longer a need to install a gasket. The wheel bearing itself can be configured so as to be hermetically sealed by the provided cover and by the partition that is permeable to the magnetic alternating field, whereby the sensor is only put in place after the cover has been mounted, in other words, without coming into contact with the lubricant.

Moreover, the proposed arrangement of the sensor holder in the cover simplifies the structure of the wheel bearing since the sensor is easy to mount and, in particular, it is automatically arranged in the optimal position for its function. Furthermore, only one part, namely, the cover, which can be mounted in a single work step, is needed to seal the wheel bearing and to attach the sensor.

It is also being proposed for the partition to be made of a metallic, non-ferromagnetic material. The use of a non-ferromagnetic material is particularly advantageous for magnetic field sensors since this does not interfere with the magnetic field and thus with the generated signal. Magnetic field sensors themselves have proven their worth for use in wheel bearings since they permit contactless transmission of the signal. As a result, the wheel bearing itself can be hermetically sealed by means of a static gasket. Moreover, the proposed approach has the advantage that the partition can be manufactured so as to be relatively strong and very dimensionally stable, as a result of which the sensor can be arranged very close to the partition and thus also to the encoder.

As an alternative, it is proposed for the cover and the partition to be made of plastic in one single piece. Thanks to the proposed embodiment, during the injection molding of the cover, the partition can also be injection molded onto it at the same time, whereby the plastic also entails the advantage that it does not interfere with the magnetic field when a magnetic field sensor is used, and it also has a very low intrinsic weight.

It is likewise proposed for the cover to be made of plastic and to be rendered dimensionally stable by means of a reinforcing part that is stronger than the plastic. Making the cover of plastic permits a cost-effective serial production as well as a weight reduction. The cover itself has two functions, namely, to seal the wheel bearing and, at the same time, to hold the sensor. Owing to these functions, the cover has to have a certain dimensional stability and strength, even under continuous load. In this case, the strength and dimensional stability can be achieved by means of the reinforcing part.

It is further proposed for the cover in this case to be attached to the outer race of the wheel bearing via the reinforcing part. Since the high strength of the reinforcing part means that is has an altogether greater dimensional stability and that it undergoes less deformation, even under the effect of external forces, the cover with the sensor arranged in it are thus attached to the wheel bearing with a greater degree of positional accuracy, which is advantageous, particularly in terms of the generation of signals, since this allows the sensor to be positioned with greater precision relative to the encoder.

The cover can be attached so that it is very dimensionally stable and it can easily be sealed in that the reinforcing part has a ring section which extends beyond the edge of the cover and with which the cover is in contact with an annular-cylindrical extension of the outer race.

In another preferred embodiment, the reinforcing part can be in the form of a thin-walled, shaped metal part, so that it can be made, for instance, as a stamped part by means of a deep-drawing process.

It is likewise proposed for the shaped metal part to have at least one cylindrical ring section and for the shaped metal part to form a folded-over section that projects radially outwards or inwards in the ring section, and for the shaped metal part to be encapsulated by injection molding, together with the plastic that forms the cover, in the area of the folded-over section. Thanks to the folded-over section and to the encapsulation by injection molding with the plastic, the reinforcing part and the plastic of the cover can be joined together positively in a particularly durable manner.

Moreover, the partition can be formed by the reinforcing part, which is especially advantageous because the reinforcing part can be configured with a very thin wall while, at the same time, it displays great strength and a high degree of dimensional stability, as a result of which the sensor can be positioned very close to the encoder. In this case, the reinforcing part is preferably made of a metallic, non-ferromagnetic material.

BRIEF DESCRIPTION OF THE DRAWINGS

The invention will be described in greater detail below with reference to several embodiments. The figures show the following in detail.

DETAILED DESCRIPTION

Figure 1:
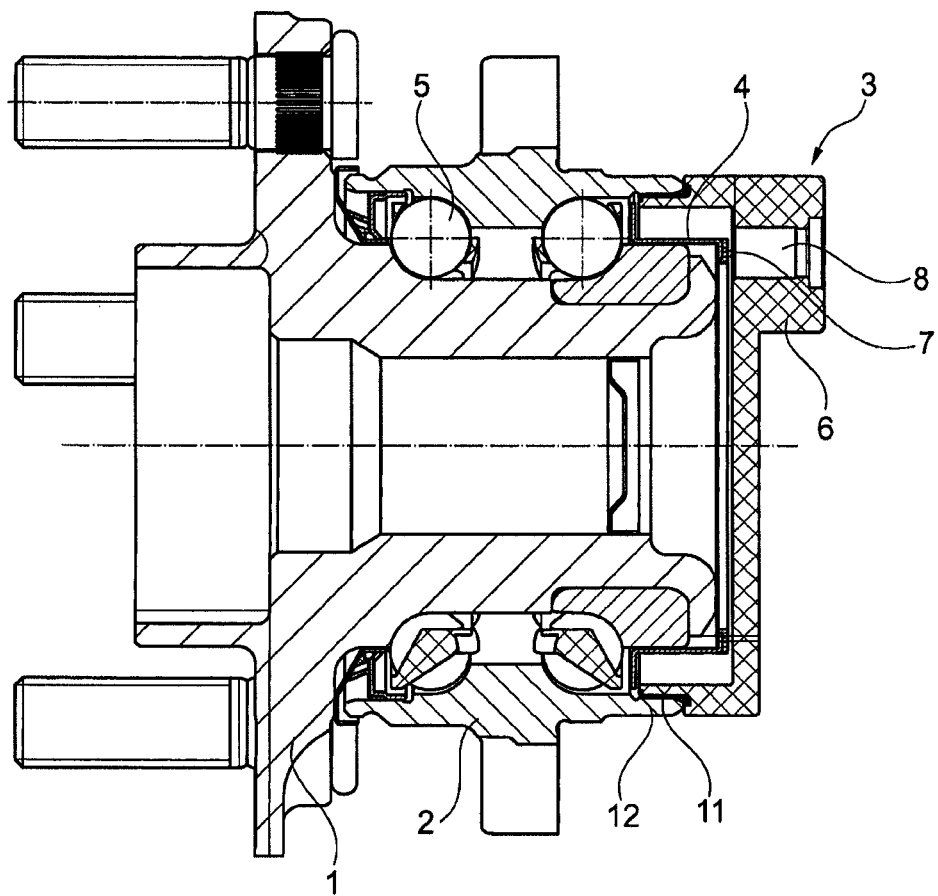
FIG. 1 a wheel bearing having a cover in a first variant.

FIG. 1 shows a conventionally designed wheel bearing with a rotating inner race 1 and a stationary outer race 2 that can be attached to the motor vehicle. The outer race 2 can be attached in a known manner to, for example, a hub carrier or to another part of the chassis of a motor vehicle, whereas the inner race 1 serves to attach a wheel of the motor vehicle. Between the outer race 2 and the inner race 1, there is a plurality of rolling elements 5 which are arranged in two bearing races aligned parallel to each other. The rotating inner race 1 likewise holds an encoder 4, for example, in the form of a toothed ring, which is non-rotatably fastened to the inner race 1 and which consequently turns along with the inner race 1 and the wheel of the motor vehicle.

A cover 3 having a sensor holder 8 in the form of an injection-molded plastic part is provided on the stationary outer race 2. The injection-molded plastic part is rendered dimensionally stable radially outwards by means of a reinforcing part 11 that is formed by an annular, shaped metal part, while the cover 3 has an annular flange. The cover 3—together with the annular flange and the reinforcing part 11 arranged on it—is inserted into an opening of the outer race 2, where its inside comes into contact with an annular flange 12 of the outer race 2.

The sensor holder 8 is also shaped onto the cover 3 when the latter is being injection molded and the sensor holder 8 is positioned in such a way that it is arranged in the attachment position of the cover so as to be situated opposite from the encoder 4. The sensor holder 8 is also closed off by a thin partition 7—formed by a thin wall of the plastic of the cover 3—with respect to the encoder 4 and the wheel bearing, so that lubricant present in the wheel bearing cannot leak or be contaminated by dirt particles that find their way in. Through the partition 7, the sensor held in the sensor holder 8 detects the magnetic alternating field generated by the encoder, in response to which it generates an electric signal that represents the rotational movement of the wheel.

Figure 2:
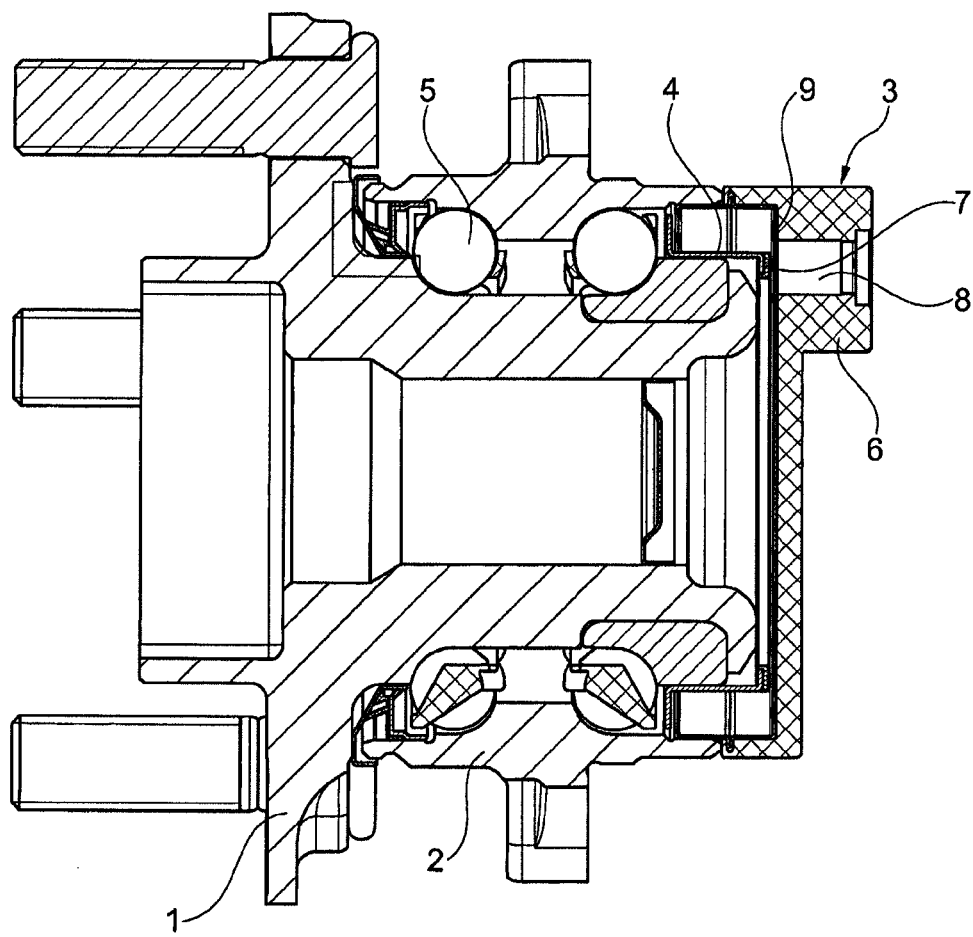
FIG. 2 a wheel bearing having a cover in a second variant.

FIG. 2 shows an alternative embodiment of the invention in which there is likewise a reinforcing part 9 which is formed by a shaped metal part configured like a shell and which concurrently forms the partition 7 that closes off the sensor holder 8.

Figure 3:
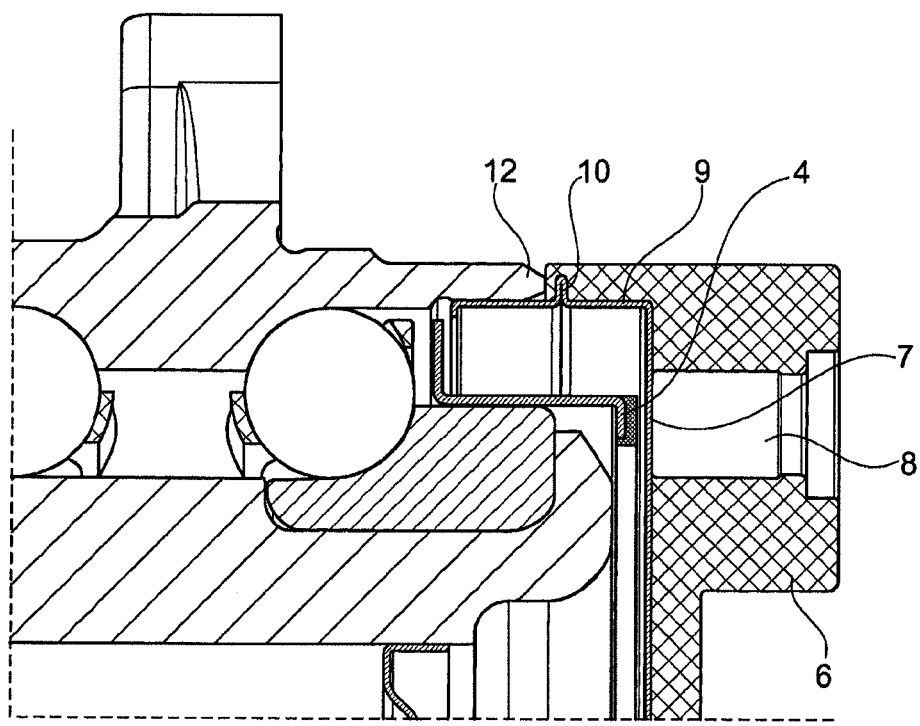
FIG. 3 the wheel bearing from FIG. 2, in an enlarged sectional view.

FIG. 3 shows the wheel bearing from FIG. 2, with an enlarged sectional view of the sensor holder 8. The side wall of the reinforcing part 9 is shaped into a folded-over section 10 that projects radially outwards and that has been encapsulated by injection molding with the plastic of the cover 3, so that the reinforcing part 9 and the cover 3 are positively joined together. The reinforcing part 9 is made of a non-ferromagnetic, metallic material. The encoder 4 consists of a ring made of ferromagnetic material and on its side facing the sensor holder 8, it is provided, for example, with teeth that project radially inwards or else with magnetic sections. The sensor holder 8 is arranged in a thickened shoulder 6 of the cover 3 that is dimensioned in such a way that the sensor is securely held in the sensor holder 8 and is protected towards the outside.

Figure 4:
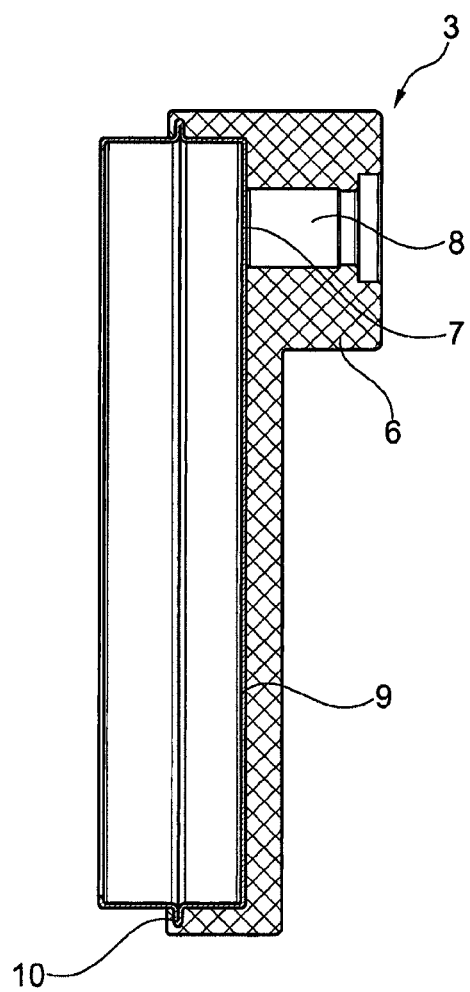
FIG. 4 a cover with a reinforcing part encapsulated by injection molding with plastic.

FIG. 4 shows the cover 3 from FIGS. 2 and 3 as a single part. The cover 3 is produced together with the reinforcing part 9 as a single part in that, after the reinforcing part 9 has been shaped, it is placed into the mold and then encapsulated by injection molding with the plastic of the cover 3.

Figure 5:
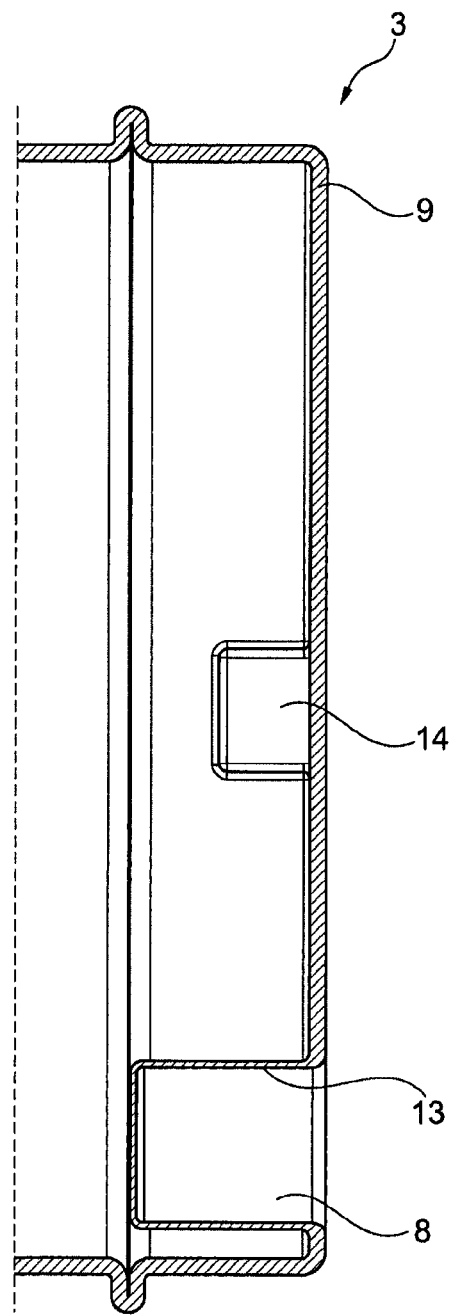
FIG. 5 a cover in the form of a shaped metal part, with a sensor holder.

FIG. 5 shows a refinement of the cover 3 in which the reinforcing part 9 itself forms the cover 3 and it has the sensor holder 8 in the form of a recess 13, so that there is no encapsulation with plastic by means of injection molding. In this case, the cover 3 has a second recess 14, for instance, with a thread in which the sensor can be affixed by means of a screwed connection to the cover 3 and thus in the sensor holder 8.

An important aspect here for the function of the invention is that the partition 7 of the cover 3 is permeable to the magnetic alternating field between the encoder 4 and the sensor. For example, when a magnetic field sensor is employed, this can be implemented by using plastic or a non-ferromagnetic material for the partition 7.

The encoder 4 can be configured, for instance, as a multi-pole encoder having a magnetization that varies along the circumference, which can be implemented, for example, by means of sections of alternating magnetic polarity that are uniformly distributed along the circumference.

In this context, instead of the radially oriented teeth and instead of the axially oriented magnetic field thus generated, the encoder 4 can also have axially oriented teeth that generate a radially oriented alternating magnetic field when the encoder is appropriately magnetized.

Here, the encoder 4 can itself be active, in other words, it can generate a magnetic field, or else it can be configured so as to be purely passive. If the encoder is configured so as to be passive, the signal is generated by the shape of the encoder 4 such as, for instance, the teeth or a waveform that generates a signal that is dependent on the shape and rotational speed of the wheel during the movement through the permanent magnetic field of the sensor.

LIST OF REFERENCE NUMERALS 1 inner race
2 outer race
3 cover
4 encoder
5 rolling element
6 shoulder
7 partition
8 sensor holder
9 reinforcing part
10 folded-over section
11 reinforcing part
12 extension
13 recess
14 recess

What is claimed is:

1. A wheel bearing having a sensor holder to hold a sensor detecting a rotational movement of a wheel, the wheel bearing comprising:
- a rotating inner race onto which the wheel of the motor vehicle can be mounted,
- a stationary outer race attached to the motor vehicle,
- an encoder associated with the rotating inner race, and
- a cover arranged on the stationary outer race, the sensor holder formed by a recess provided in the cover arranged opposite from the encoder, the recess being closed on the side facing the encoder by a partition permeable to a magnetic alternating field between the encoder and the sensor,
- wherein the cover is made of plastic and rendered dimensionally stable by a reinforcing part stronger than the plastic,
- wherein the reinforcing part is a thin-walled, shaped metal part, and
- wherein the shaped metal part has at least one cylindrical ring section and the shaped metal part forms a folded-over section projecting radially outwards or inwards in the ring section, and the shaped metal part is encapsulated by injection molding, together with the plastic that forms the cover, in the area of the folded-over section.

2. The wheel bearing as recited in claim 1 wherein the partition is made of a metallic, non-ferromagnetic material.

3. The wheel bearing as recited in claim 1 wherein the cover and the partition are made of the plastic in one single piece.

4. The wheel bearing as recited in claim 1 wherein the cover is attached to the outer race of the wheel bearing via the reinforcing part.

5. The wheel bearing as recited in claim 4 wherein the reinforcing part has a ring section extending beyond or into the edge of the cover and with which the cover is in contact with an annular-cylindrical extension of the outer race.

6. The wheel bearing as recited in claim 1 wherein the partition is formed by the reinforcing part.

7. The wheel bearing as recited in claim 1 wherein the encoder is configured as a multi-pole encoder having a magnetization varying along the circumference.

* * * * *